(12) United States Patent
Takeuchi et al.

(10) Patent No.: US 9,227,352 B2
(45) Date of Patent: Jan. 5, 2016

(54) INJECTION MOLDING MACHINE

(71) Applicant: SUMITOMO HEAVY INDUSTRIES, LTD., Tokyo (JP)

(72) Inventors: Shigeru Takeuchi, Chiba (JP);
Masahiro Hayakawa, Chiba (JP);
Yosuke Ito, Chiba (JP); Akihisa Kobayashi, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 146 days.

(21) Appl. No.: 13/834,255

(22) Filed: Mar. 15, 2013

(65) Prior Publication Data

US 2013/0251837 A1 Sep. 26, 2013

(30) Foreign Application Priority Data

Mar. 21, 2012 (JP) ................................. 2012-064512

(51) Int. Cl.
*B28B 7/10* (2006.01)
*B29C 45/40* (2006.01)
*B29C 45/76* (2006.01)

(52) U.S. Cl.
CPC ......... *B29C 45/4005* (2013.01); *B29C 45/7626* (2013.01); *B29C 2045/764* (2013.01); *B29C 2945/7602* (2013.01); *B29C 2945/76013* (2013.01); *B29C 2945/7624* (2013.01); *B29C 2945/76076* (2013.01); *B29C 2945/76096* (2013.01); *B29C 2945/76418* (2013.01); *B29C 2945/76896* (2013.01); *B29C 2945/76943* (2013.01)

(58) Field of Classification Search
CPC ............ B29C 45/4006; B29C 45/7626; B29C 2045/764
USPC .......................................................... 425/150
See application file for complete search history.

(56) References Cited

U.S. PATENT DOCUMENTS

| | | | |
|---|---|---|---|
| 3,726,625 A * | 4/1973 | Rees | B29C 45/4005 249/68 |
| 5,736,079 A * | 4/1998 | Kamiguchi | B29C 45/40 264/334 |
| 6,811,391 B1 | 11/2004 | Klaus et al. | |
| 2008/0233227 A1 | 9/2008 | Onishi et al. | |

FOREIGN PATENT DOCUMENTS

| | | |
|---|---|---|
| DE | 102010034451 | 3/2011 |
| GB | 1437735 | 6/1976 |
| JP | 04-168018 | 6/1992 |
| WO | WO 2005/068155 | 7/2005 |

* cited by examiner

*Primary Examiner* — Joseph S. Del Sole
*Assistant Examiner* — John Robitaille
(74) *Attorney, Agent, or Firm* — IPUSA, PLLC

(57) ABSTRACT

An injection molding machine including an ejector unit configured to eject a molding product from a mold, wherein the ejector unit includes a slide base freely movable relative to a toggle support disposed at a platen supporting the mold, a toggle mechanism configured to connect the toggle support and the slide base, disposed between the toggle support and the slide base, a driving source configured to operate the toggle mechanism in such a way that a distance between the toggle support and the slide base is changed, and an ejection member movable in conjunction with the slide base.

6 Claims, 9 Drawing Sheets

US 9,227,352 B2

INJECTION MOLDING MACHINE

RELATED APPLICATION

The present application is based on Japanese Priority Application No. 2012-064512, filed on Mar. 21, 2012, and No. 2012-281564, filed on Dec. 25, 2012, with the Japanese Patent Office, the entire contents of which are hereby incorporated by reference.

Priority is claimed to Japanese Priority Application No. 2012-064512, filed on Mar. 21, 2012, with the Japanese Patent Office.

BACKGROUND

1. Technical Field

The disclosures herein generally relate to an injection molding machine.

2. Description of Related Art

An injection molding machine produces a molding product by filling melted resin into a cavity space of a molding unit, then solidifying the resin. The molding unit is configured with a stationary mold and a movable mold, between which the cavity space is formed when the molding unit is clamped. An article molded in the cavity space is ejected from the movable mold after opening the molding unit. An ejector unit is used for ejection (see, for example, WO 2005/068155). The molding product ejected from the movable mold is taken out from the injection molding machine by a take-out robot.

SUMMARY

According to at least one embodiment of the present invention, an injection molding machine including an ejector unit configured to eject a molding product from a mold, wherein the ejector unit includes a slide base freely movable relative to a toggle support disposed at a platen supporting the mold, a toggle mechanism configured to connect the toggle support and the slide base, disposed between the toggle support and the slide base, a driving source configured to operate the toggle mechanism in such a way that a distance between the toggle support and the slide base is changed, and an ejection member movable in conjunction with the slide base.

DETAILED DESCRIPTION

Figure 1:
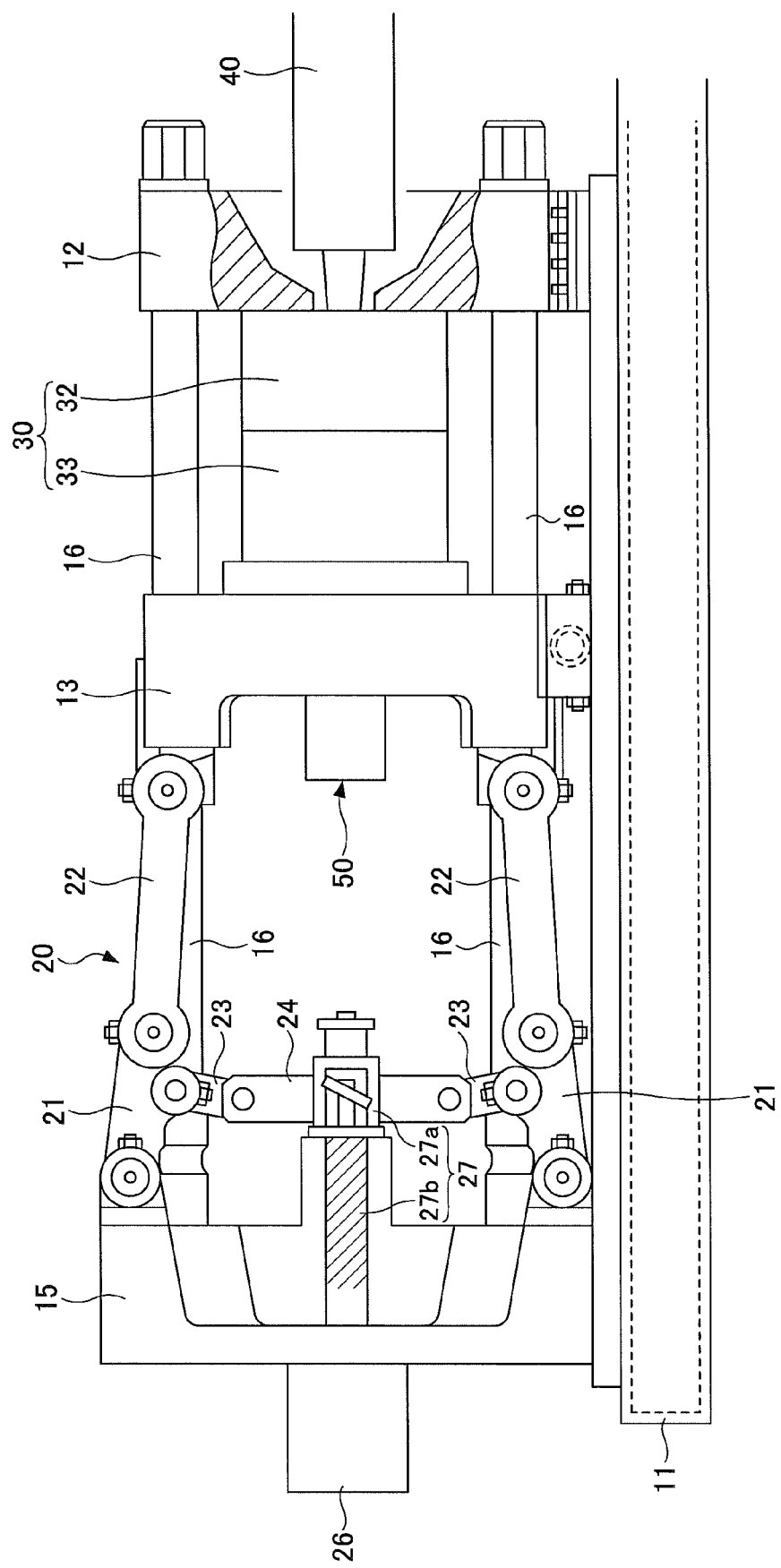
FIG. 1 is a general schematic view of an injection molding machine according to an embodiment of the present invention.

According to at least one embodiment of the present invention, it is possible to provide an injection molding machine whose ejection characteristics can be controlled.

In the following, preferred embodiments of the present invention will be described with reference to the drawings. In the drawings, the same or corresponding elements across the drawings are attached with the same or corresponding numerical codes, whose explanation may not be repeated. For convenience of description, a direction in which a movable platen moves when closing a molding unit is referred to as the "forward direction", a direction in which a movable platen moves when opening the molding unit is referred to as the "backward direction".

The First Embodiment

FIG. 1 is a general schematic view of an injection molding machine according to the first embodiment of the present invention. FIG. 1 shows a state of the injection molding machine when the molding unit is clamped.

The injection molding machine 10 shown in the FIG. 1 is a horizontally-oriented injection molding machine in which the molding unit is clamped horizontally. The injection molding machine 10 includes a frame 11, a stationary platen 12 fixed to the frame 11, a toggle support 15 disposed at a prescribed distance apart from the stationary platen 12 and movable freely relative to the frame 11. Between the stationary platen 12 and the toggle support 15, multiple tie bars, for example, four tie bars, are provided.

The injection molding machine 10 also has a movable platen 13 movable in the forward/backward direction (the horizontal direction in FIG. 1) along the tie bars 16. A movable mold 33 is attached to a surface of the movable platen 13 facing to a stationary platen 12, and a stationary mold 32 is attached to a surface of the stationary platen 12 facing to the movable platen 13. A molding unit 30 is configured with the stationary mold 32 and the movable mold 33.

The injection molding machine 10 also has a toggle mechanism 20 disposed between the movable platen 13 and the toggle support 15, a mold clamping motor 26 to operate the toggle mechanism 20, a ball screw mechanism 27 as a transmission mechanism to convert rotational motion generated by the mold clamping motor 26 into linear motion to transmit to the toggle mechanism 20. A mold clamping unit is configured with the stationary platen 12, the movable platen 13, the toggle support 15, the toggle mechanism 20, the mold clamping motor 26, and the like.

The toggle mechanism 20 has a crosshead 24 movable in the forward/backward direction parallel to the mold opening/closing direction, the second toggle links 23 attached to the crosshead 24 so that they can rotate about an axis, the first toggle links 21 attached to the toggle support 15 so that they can rotate about an axis, and the toggle arms 22 attached to the movable platen 13 so that they can rotate about an axis. The first toggle links 21 and the second toggle links 23, and the first toggle links 21 and the toggle arms 22, are link-connected, respectively. The toggle mechanism 20 is a so-called "involute five-articulation double-toggle mechanism", with a vertically symmetrical configuration.

The ball screw mechanism 27 is configured with, for example, the ball screw nut 27a fixed to the crosshead 24, and the ball screw shaft 27b screwed into the ball screw nut 27a. The ball screw shaft 27b is supported by the toggle support 15 in a freely rotatable way. When the output shaft of the mold clamping motor 26 rotates, the ball screw shaft 27b rotates, which moves the ball screw nut 27a forward/backward, to move the crosshead 24 forward/backward.

Next, operations of the injection molding machine 10 configured as above will be described.

By driving the mold clamping motor 26 with forward rotation to move the crosshead 24 forward, the toggle mechanism 20 operates to move the movable platen 13 forward to close the molding unit 30.

By driving the mold clamping motor 26 further forward, the toggle mechanism 20 generates mold clamping force obtained from propelling force multiplied by the toggle factor. The mold clamping force clamps the molding unit 30. A cavity space (not shown) is formed between the stationary mold 32 and the movable mold 33 in a clamped state. Melted resin discharged from an injection unit 40 is filled into the cavity space to be solidified to make a molding product.

Next, by driving the mold clamping motor 26 with backward rotation to move the crosshead 24 backward, the toggle mechanism 20 operates to move the movable platen 13 backward, the molding unit 30 is opened. After that, by operating an ejector unit 50, the molding product is ejected from the movable mold 33.

In the present embodiment, the mold clamping unit generates mold clamping force by using the toggle mechanism 20. However, the toggle mechanism 20 may not be used. Instead, propelling force generated by the mold clamping motor 26 may be directly transmitted to the movable platen 13. Alternatively, propelling force generated by a mold clamping cylinder may be directly transmitted to the movable platen 13, a linear motor may open/close the molding unit 30, or an electromagnet may clamp the molding unit 30. There is no restriction on a mold clamping mechanism.

Figure 2:
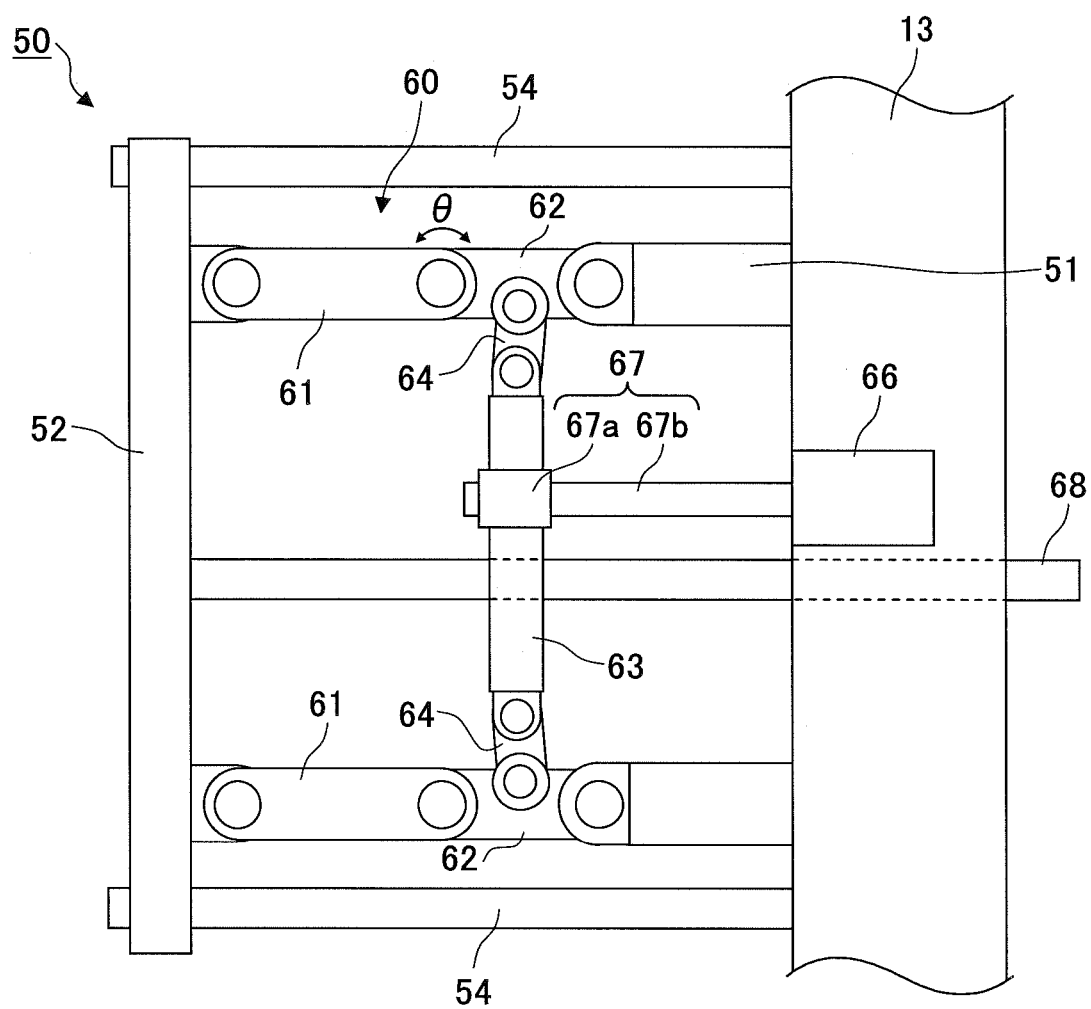
FIG. 2 is a schematic view showing a state of an ejector unit when starting ejection according to an embodiment.
Figure 3:
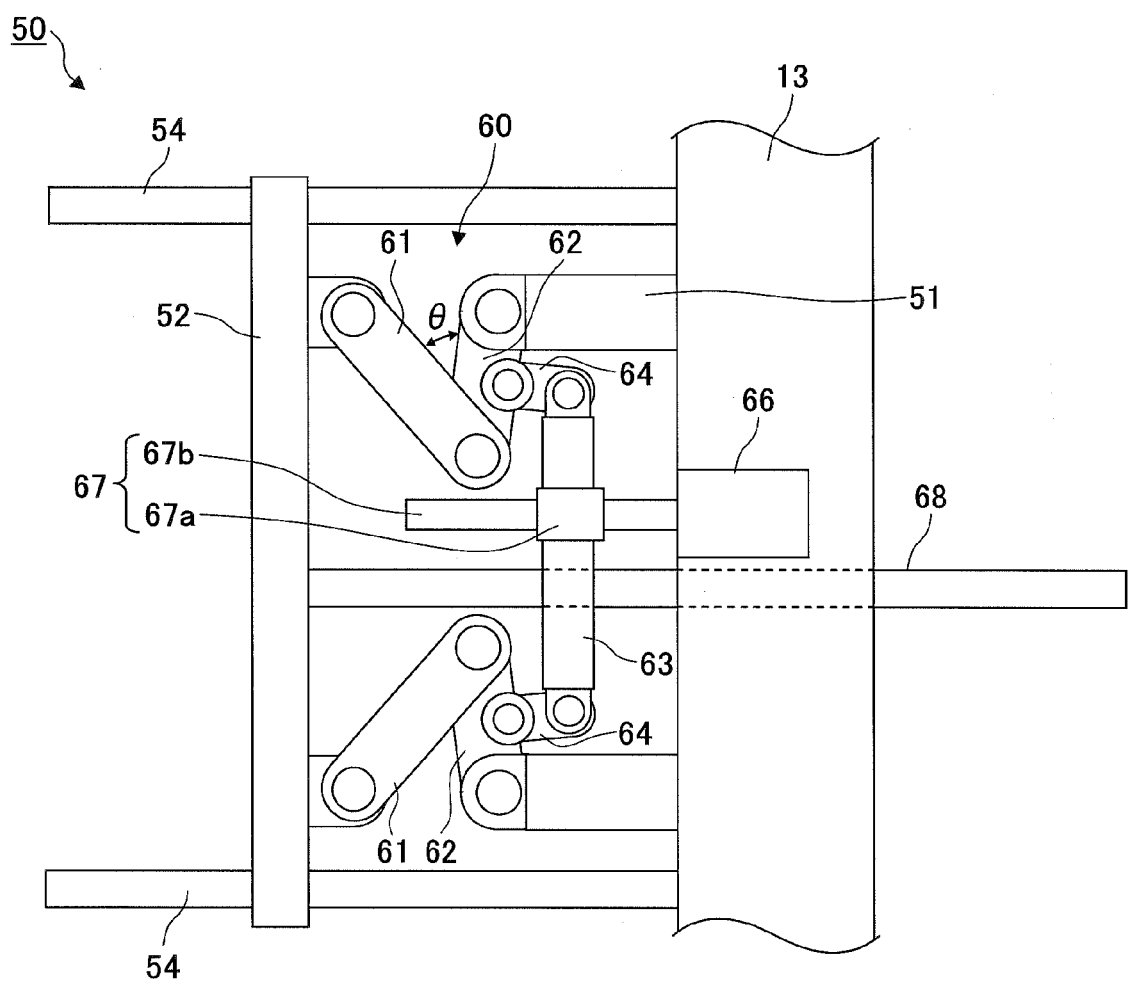
FIG. 3 is a schematic view showing a state of an ejector unit when completing ejection according to an embodiment.

FIG. 2 is a schematic view showing a state of the ejector unit 50 when starting ejection according to the first embodiment. FIG. 3 is a schematic view showing a state of the ejector unit 50 when completing ejection according to the first embodiment. In the following, an "ejector" is abbreviated as an "EJ". For example, an "EJ motor" denotes an "ejector motor".

The injection molding machine 10 includes the ejector unit 50 used for ejecting a molding product from the movable mold 33. The ejector unit 50 is attached to the movable platen 13.

The ejector unit 50 has a slide base 52 movable freely in a direction moving toward or away from an EJ toggle support 51 disposed at the movable platen 13. The EJ toggle support 51 may be provided as a part of the movable platen 13. The slide base can move freely in the mold opening/closing direction (the horizontal direction in FIG. 2) along multiple guide rods 54, for example, four rods protruding backward from the movable platen 13.

The ejector unit 50 also has an EJ toggle mechanism 60 disposed between the EJ toggle support 51 and the slide base 52, an EJ motor 66 as a driving source to operate the EJ toggle mechanism 60, and an EJ ball screw mechanism 67. The EJ ball screw mechanism 67 is a transmission mechanism to convert rotational motion generated by the EJ motor 66 into linear motion to transmit to the EJ toggle mechanism 20.

The EJ toggle mechanism 60 also has EJ toggle arms 61 attached to the slide base 52 so that they can rotate about an axis, the first EJ toggle links 62 attached to the EJ toggle support 51 so that they can rotate about an axis. An end of the EJ toggle arm 61 and an end of the first EJ toggle link 62 are connected to each other movable rotationally. When the EJ toggle arms 61 and the first EJ toggle links 62 are extended or contracted around the connection point, the slide base 52 moves forward/backward relative to the EJ to support 51.

The locations of the EJ toggle arms 61 and the first EJ toggle links 62 may be interchanged. Namely, the EJ toggle arms 61 may be attached to the EJ toggle support 51 so that they can rotate about an axis, and the first EJ toggle links 62 may be attached to the slide base 52 so that they can rotate about an axis.

The EJ toggle mechanism 60 also has an EJ crosshead 63 movable in a direction moving toward or away from the EJ toggle support 51, the second EJ toggle links 64 attached to the EJ crosshead 53 and the first EJ toggle links 62 so that they can rotate about an axis.

The EJ toggle mechanism 60 is a so-called "involute five-articulation double-toggle mechanism", with a vertically symmetrical configuration. Other toggle mechanisms may be adopted. For example, the EJ toggle mechanism 60 may be an evolute toggle, a single toggle, or a four-articulation toggle.

The EJ ball screw mechanism 67 is configured with, for example, the EJ ball screw nut 67a fixed to the EJ crosshead 63, and the EJ ball screw shaft 67b screwed into the ball screw nut 67a. The output shaft of the EJ motor 66 and the EJ ball screw shaft 67b may be directly connected coaxially. When the output shaft of the EJ motor 66 rotates, the EJ ball screw shaft 67b rotates, which moves the EJ ball screw nut 67a forward/backward, to move the EJ crosshead 63 forward/backward.

In the present embodiment, the output shaft of the EJ motor 66 and the EJ ball screw shaft 67b are directly connected coaxially. These may be connected, however, via a deceleration mechanism configured with multiple gears, or via a timing belt or the like.

The EJ motor 66 may be an electric servomotor, and may have an encoder section to detect the number of rotations of the output shaft of the EJ motor 66. The EJ motor 66 may be feed-back-controlled based on a result detected by the encoder section.

The EJ motor 66 may be attached to either of the EJ toggle support 51 or the slide base 52, or may be attached to the one having a shorter distance between the EJ motor 66 and the EJ crosshead 63. For example, as shown in FIGS. 2 and 3, if the first EJ toggle links 62 are attached to the EJ toggle support so that they can rotate about an axis, the EJ motor 66 may be attached to the EJ toggle support 51. On the other hand, if the first EJ toggle links 62 are attached to the slide base 52 so that they can rotate about an axis, the EJ motor 66 may be attached to the slide base 52. Then, the EJ ball screw shaft 67b becomes shorter, which can prevent the EJ ball screw shaft 67b from being deformed unintentionally.

The ejector unit 50 also has an ejector rod as an ejection member moving in conjunction with the slide base 52. The ejector rod 68 is fixed to the slide base 52, movably inserted into a through hole formed in the movable platen 13. The tip of the ejector rod 68 may be connected to a molding product ejection member (not shown) disposed at the movable mold 33 (see FIG. 1).

Next, operations of the ejector unit 50 configured as above will be explained. By driving the EJ motor 66 with forward rotation to move the EJ crosshead 63 forward, the toggle mechanism 60 operates to move the slide base 52 and the ejector rod 68 forward. As the ejector rod 68 moves forward, the mold article ejection member is ejected from the movable mold 33 to separate the molding product from the movable mold 33. After that, the ejector rod 68 further moves forward, to convey the molding product to a pick-up position.

After the mold article is picked up from the injection molding machine 10, by driving the EJ motor 66 with backward rotation to move the EJ crosshead 63 backward, the toggle mechanism 60 operates to move the slide base 52 and the ejector rod 68 backward. As the ejector rod 68 moves backward, the molding product ejection member moves back to the original position.

The ejector rod 68 can wait at an ejection start position (the position in FIG. 2) while the molding unit 30 is closing or clamping. The ejector rod 68 moves forward from the ejection start position to an ejection completion position (the position in FIG. 3) after the molding unit 30 opened. After the molding product is picked up by a take-out robot, the ejector rod 68 moves back to the ejection start position.

The ejector rod 68 may start to move forward while the molding unit 30 is opening to shorten the cycle time of molding.

In the present embodiment, as shown in FIGS. 2 and 3, the slide base 52 is disposed at a greater distance apart from the movable mold 33 than the EJ toggle support 51. Therefore, when the ejector rod moves forward from the ejection start position, the distance between 52 and the EJ toggle support 51 becomes short, and an angle θ between the EJ toggle arm 61 and the first EJ toggle link 62 becomes small.

If the rotational velocity of the EJ motor 66 is fixed, the smaller the angle θ formed by the EJ toggle arm 61 and the first EJ toggle link 62 becomes, in principle, the faster the moving velocity of the slide base 52 and the ejection speed is. Also, if the rotational torque of the EJ motor 66 is fixed, the larger the angle θ formed by the EJ toggle arm 61 and the first EJ toggle link 62, the stronger the propelling force of the slide base 52 and the ejection force.

In the present embodiment, as described above, when the ejector rod 68 moves forward from the ejection start position, the angle θ between the EJ toggle arm 61 and the first EJ toggle link 62 becomes small. Therefore, when starting an ejection process, the ejection speed is slow and the ejection force is strong, which makes it easier to separate a molding product. After separating the molding product, the ejector rod 68 moves further forward to make the ejection speed become faster, which conveys the molding product to the pick-up position faster.

In the present embodiment, the ejector rod 68 is fixed to the slide base 52. The ejector rod 68 may be fixed to, however, a middle plate (not shown) which is fixed to the slide base 52 via a connecting rod. Either of these or the like may be adopted as long as the slide base 52 and the ejector rod 68 can move together.

The Second Embodiment

In the first embodiment described above, the EJ rod 68 is fixed to the slide base. In the second embodiment, on the other hand, an EJ rod 168 (see FIG. 4) is fixed to a middle plate, which is fixed to a slide base, via connecting rods. The ejection member is configured with the EJ rod, the middle plate, and the connecting rods.

Figure 4:
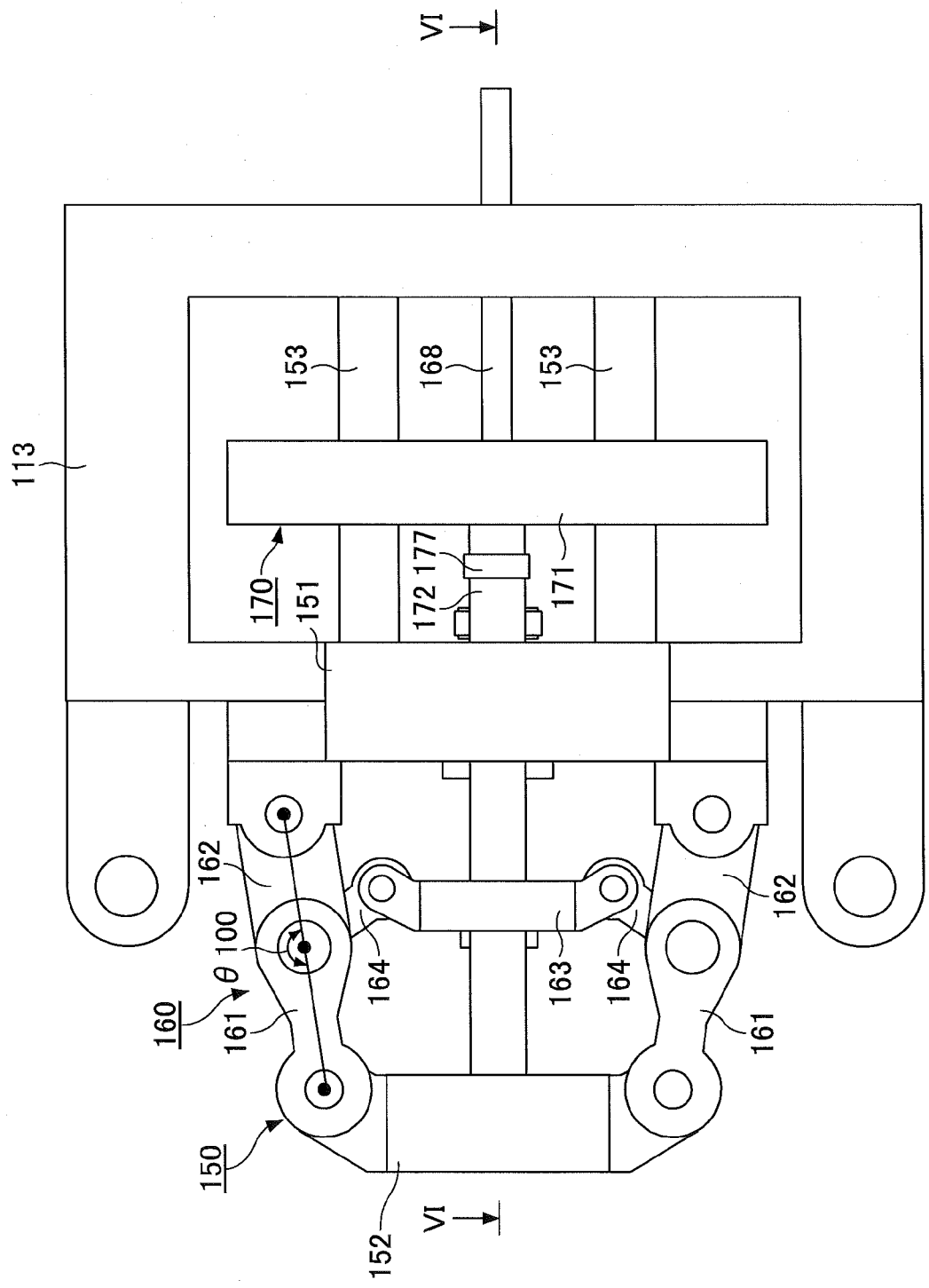
FIG. 4 is a schematic view showing a state of an ejector unit when starting ejection according to another embodiment.
Figure 5:
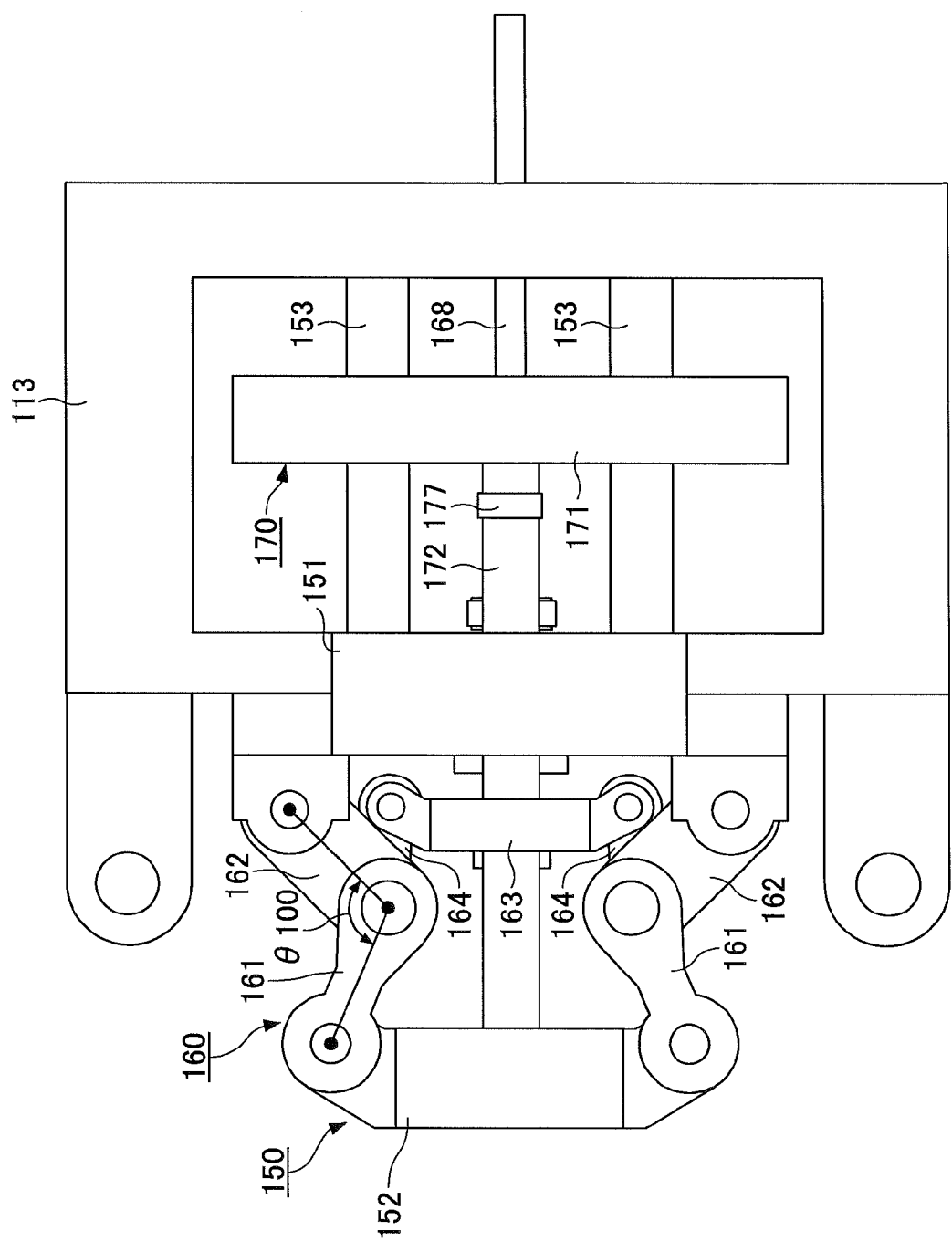
FIG. 5 is a schematic view showing a state of an ejector unit when completing ejection according to another embodiment.
Figure 6:
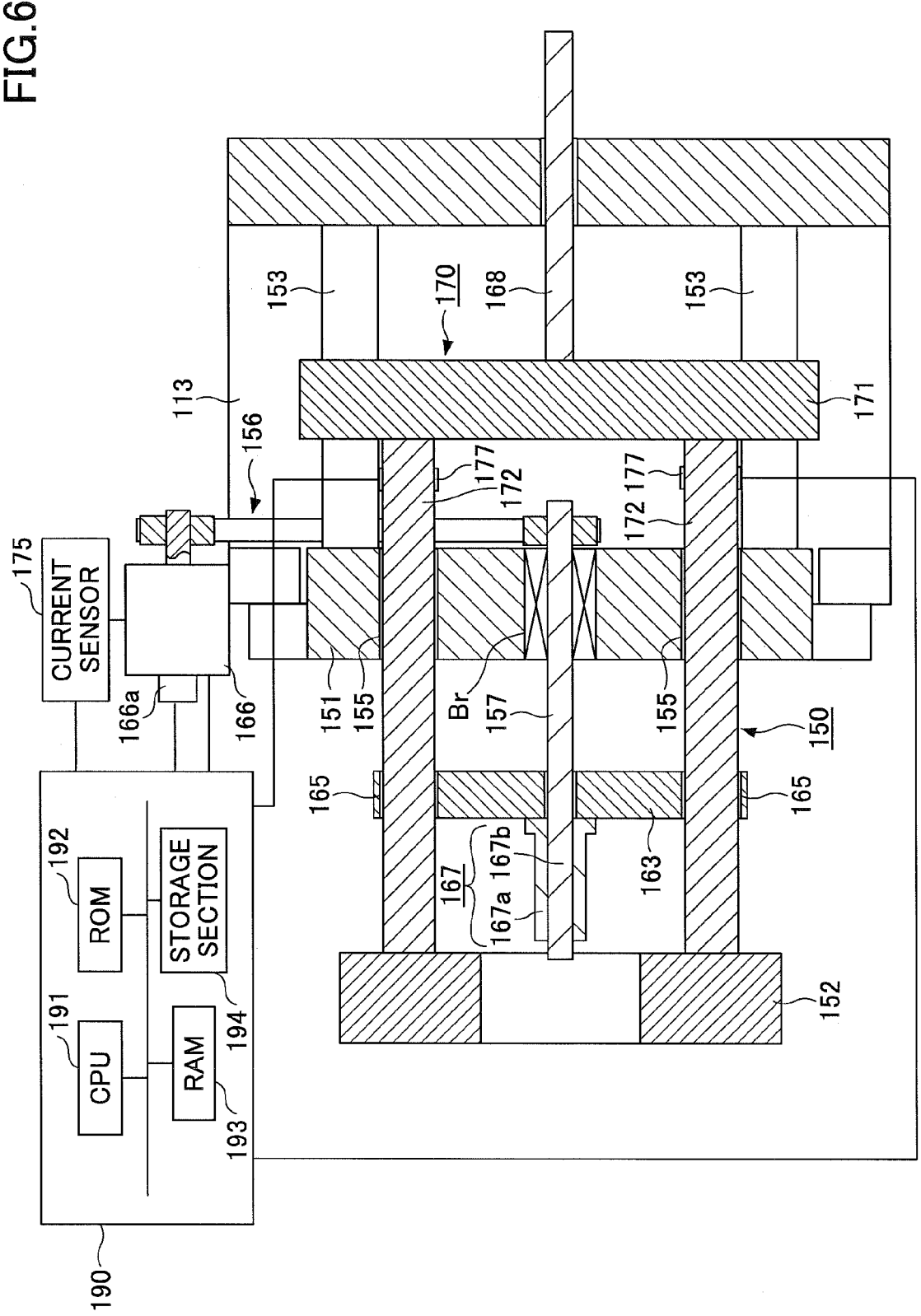
FIG. 6 is a cross-sectional view of an ejector unit taken along the line VI-VI of FIG. 4.

FIG. 4 is a schematic view showing a state of an ejector unit 150 when starting ejection according to the second embodiment. FIG. 5 is a schematic view showing a state of the ejector unit 150 when completing ejection according to the second embodiment. FIG. 6 is a cross-sectional view of the ejector unit 150 taken along the line VI-VI of FIG. 4.

The ejector unit 150 is used for ejecting a molding product from the movable mold 33, disposed at a movable platen 113.

The ejector unit 150 includes an EJ toggle support 151, an EJ movable platen 152 as a slide base, an EJ toggle support 160, an EJ motor 166 (see FIG. 6) as a driving source, and an ejection member 170.

The EJ toggle support 151 is formed separately from the movable platen 113, fixed to the movable platen 113 with bolts or the like. Alternatively, the EJ toggle support 151 may be formed as a part of the movable platen 113. The EJ toggle support 151 has an attachment section to attach the EJ toggle support 160.

The EJ movable platen 152 can move forward/backward relative to the EJ toggle support 151. The EJ movable platen 152 is disposed at a greater distance apart from the movable mold 33 (see FIG. 1) than the EJ toggle support 151. The EJ movable platen 152 has an attachment section to be attached with the EJ toggle support 160.

The EJ toggle support 160 converts input force (propelling force generated by the EJ motor 166, specifically axial force of an EJ ball screw mechanism 167 to output force (ejection force) to transmit to the EJ movable platen 152. The EJ toggle support 160 is disposed between the EJ toggle support 151 and the EJ movable platen 152.

The EJ toggle support 160 has, as shown in FIGS. 4 and 5, EJ toggle arms 161 attached to the EJ movable platen 152 so that they can rotate about an axis and the first EJ toggle links 162 attached to the EJ toggle support 151 so that they can rotate about an axis. The EJ toggle arms 161 and the first EJ toggle links 162 are connected to make rotational motion relative to each other around the position point.

The positions of the EJ toggle arms 161 the first EJ toggle links 162 may be interchanged. Namely, the EJ toggle arms 161 may be attached to the EJ toggle support 151 so that they can rotate about an axis, and the first EJ toggle links 162 may be attached to the slide base 152 so that they can rotate about an axis.

The EJ toggle mechanism 160 also has an EJ crosshead 163 movable in the direction moving toward or away from the EJ toggle support 151, the second EJ toggle links 164 attached to the EJ crosshead 163 and the first EJ toggle links 162 so that they can rotate about an axis.

The EJ toggle mechanism 160 is a so-called "involute five-articulation double-toggle mechanism", with a vertically symmetrical configuration. Other toggle mechanisms may be adopted. For example, the EJ toggle mechanism 160 may be an evolute toggle, a single toggle, or a four-articulation toggle.

The EJ motor 166 is a driving source to operate the EJ toggle mechanism 160. The EJ motor 166 is disposed, for example, at the movable platen 113. The position of the EJ motor 166 is not restricted specifically. Therefore it can be disposed at the EJ toggle support 151, the EJ movable platen 152, etc.

The EJ motor 166 may have an encoder section 166a to detect the number of rotations of the output shaft of the EJ motor 166. Also, the EJ motor 166 may be connected with a current sensor 175 to detect a current supplying to the EJ motor 166.

Rotational motion of the EJ motor 166 is converted to linear motion by the EJ ball screw mechanism 167, to transmit to the EJ toggle support 160. The EJ ball screw mechanism 167 is configured with, for example, the EJ ball screw nut 167a fixed to the EJ crosshead 163, the EJ ball screw shaft 167b screwed into the EJ ball screw nut 167a. A rotation shaft 157 (see FIG. 6) extended forward coaxially from the EJ ball screw mechanism 167 is attached to the EJ toggle support 151 via bearings Br or the like to be rotative. The rotation shaft 157 cannot move forward or backward relative to the EJ toggle support 151. The rotation shaft 157 is connected to the output shaft of the EJ motor 166 via connection members 156 such as a belt or a pulley. By rotating the output shaft of the EJ motor 66 to rotate the EJ ball screw shaft 167b, the EJ ball screw nut 167a and the EJ crosshead 163 move forward/backward relative to the movable platen 33.

In the present embodiment, the rotation shaft 157 is connected to the output shaft of the EJ motor 166 via the connection members 156. Alternatively, the rotation shaft 157 may be connected to the output shaft of the EJ motor 166 directly.

By driving the EJ motor 166 with forward rotation to move the EJ crosshead 163 forward relative to the movable platen 33, the toggle mechanism 160 operates to move the EJ movable platen 152 forward. On the other hand, by driving the EJ motor 166 with backward rotation to move the EJ crosshead 163 backward relative to the movable platen 33, the toggle mechanism 160 operates to move the EJ movable platen 152 backward.

The ejection member 170 is a member moving in conjunction with the EJ movable platen 152. The ejection member 170 is configured with, for example, an EJ plate 171 as a middle plate, EJ tie bars 172 as connection rods, and an EJ rod 168.

The EJ plate 171 may be disposed closer to the movable mold 33 than the EJ toggle support 151, for example, at the inside of the movable platen 113. the EJ plate 171 is formed with a guide hole to be inserted with guide bars 153, along which the EJ plate 171 can move forward/backward. The rear ends of the guide bars 153 are fixed to the EJ toggle support 151, and the front ends of the guide bars 153 are fixed to the movable platen 113. Alternatively, only one of the ends may be fixed to the respective member.

The EJ tie bars 172 are members to connect the EJ movable platen 152 and the EJ plate 171 with a certain amount of distance in-between. On the outer circumference of the EJ tie bar 172, a separating force sensor 177 is provided to detect separating force of a molding product by detecting distortion of the EJ tie bar 172 generated when the molding product is separated from the movable mold 33. The separating force is force needed to separate a molding product from the movable mold 33, which is generated when the molding product adhering to the movable mold 33 is pushed in the ejection direction. Until the molding product is pushed in the ejection direction, the separation force is not generated while driving the EJ motor 166. If the movable mold 33 is divided into parts to make it easier to pick up a molding product, the separation force includes force to slide some parts of the movable mold 33 relative to the rest of parts of the movable mold 33.

As described above, according to the present embodiment, the separation force is detected by the separating force sensor 177 to monitor the status of mold separation.

The separation force sensor 177 may be provided for each of the multiple EJ tie bars 172 to detect force working on the multiple EJ tie bars 172 at the same time while driving the EJ motor 166. Balance between the multiple EJ tie bars 172 can be monitored. The balance can be determined as appropriate or not, for example, whether a difference between the maximum force and the minimum force applied to the multiple EJ tie bars 172 is within a prescribed range.

In the present embodiment, the separation force sensor 177 is configured with the distortion sensors provided at the outer circumference of the EJ tie bars 172. Alternatively, for example, the separation force sensor 177 may be disposed between the EJ tie bar 172 and the EJ plate 171, configured with a load cell compressed when the molding product is separated from the movable mold 33. Type and position of the sensor is not restricted. A position of the sensor is not restricted as long as the disposed position is on a member driven by the EJ motor 166, for example, the EJ toggle support 160, the EJ ball screw mechanism 167, the EJ movable platen 152, the EJ rod 168, etc.

The EJ tie bars 172 are inserted into the guide holes 155 at the EJ toggle support 151 to freely move forward/backward through the guide holes 155. Multiple guide holes 155 may be provided corresponding to the multiple EJ tie bars 172, for example, two bars, which prevents the EJ movable platen 152 from rotating forward/backward.

The EJ tie bars 172 are also inserted into the guide holes 165 at the EJ crosshead 163 to freely move forward/backward through the guide holes 165. Multiple guide holes 165 may be provided corresponding to the multiple EJ tie bars 172, for example, two bars, which prevents the crosshead 163 from rotating forward/backward.

The rear end of the EJ rod 168 is fixed to the EJ plate 171, and the front end of the EJ rod 168 may be connected to a molding product ejection member (not shown) disposed at the movable platen 33 (see FIG. 1). By moving the EJ rod 168 forward, the molding product ejection member separates a molding product from the movable platen 33. By moving the EJ rod 168 further forward, the molding product ejection member conveys the molding product to a pick-up position. After that, by moving the EJ rod 168 backward, the molding product ejection member returns to the original position. The EJ plate 171 may be attached with multiple EJ rods 168.

The ejection member 170 can wait at an ejection start position (the position in FIG. 4) while the molding unit 30 is closing or clamping. The ejection member 170 moves forward from the ejection start position to an ejection completion position (the position in FIG. 5) after the molding unit 30 opened. After the molding product is picked up by a take-out robot, the ejection member 170 moves back to the ejection start position.

The ejection member 170 may start to move forward while the molding unit 30 is opening to shorten the cycle time of molding.

While moving the ejection member 170 forward/backward relative to the movable mold 33, the controller 190 monitors the position of the ejection member 170 relative to the movable mold 33 to supply current to the EJ motor 166 in response to the monitored result. The position of the ejection member 170 relative to the movable mold 33 can be calculated from a detected result by the encoder section 166a of the EJ motor 166. The torque of the EJ motor 166 can be calculated, for example, from a detected result by the current sensor 175.

Figure 7:
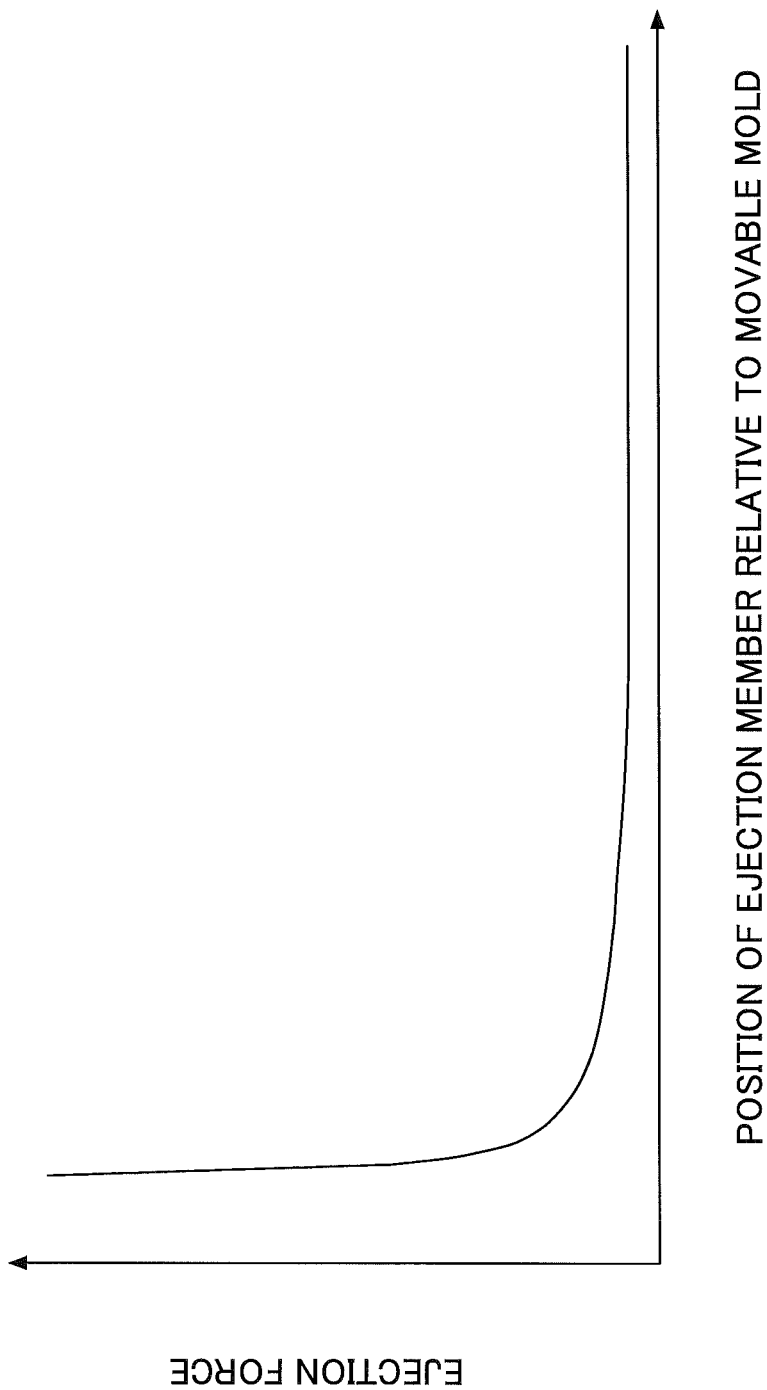
FIG. 7 is a graph showing a relationship between ejection force of an ejector unit and a position of an ejection member relative to a movable mold according to an embodiment.
Figure 8:
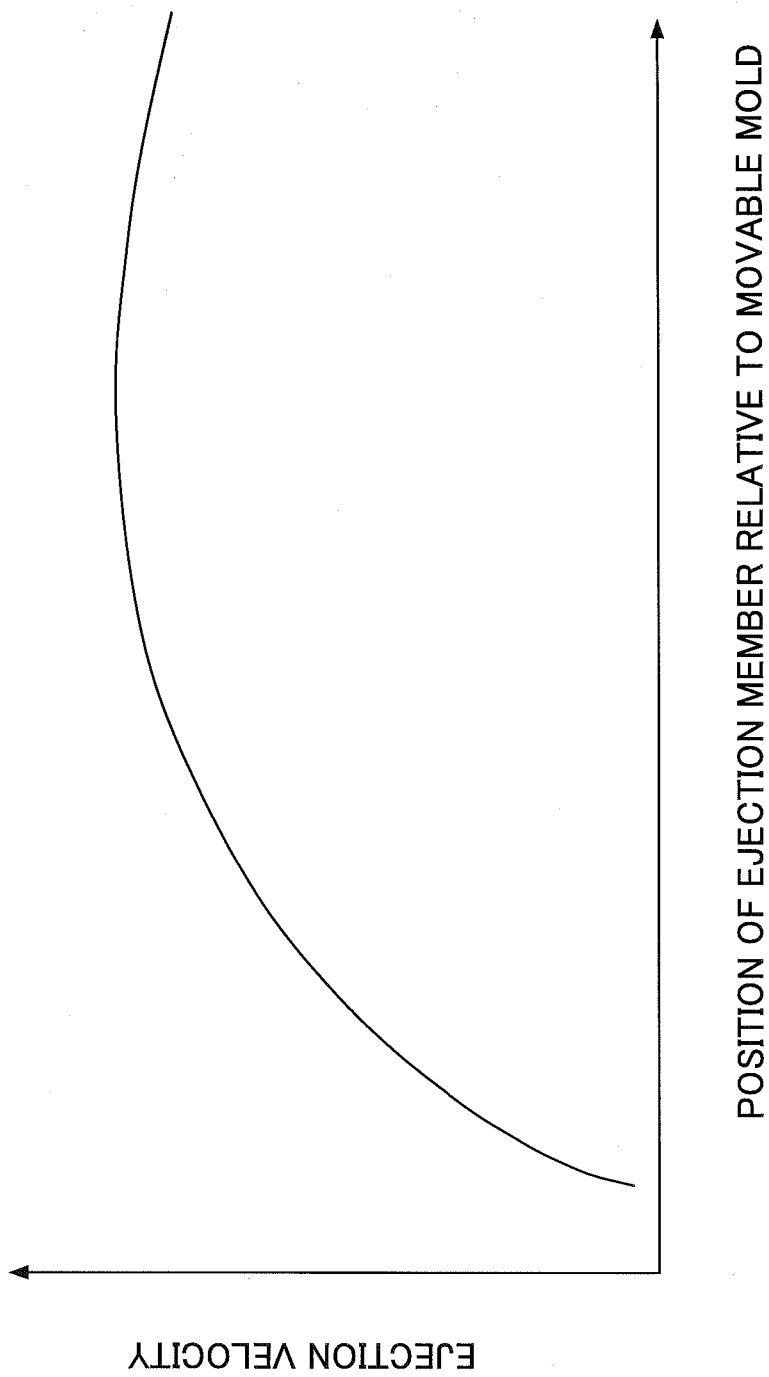
FIG. 8 is a graph showing a relationship between ejection speed of an ejector unit and a position of an ejection member relative to a movable mold according to an embodiment.

FIG. 7 is a graph showing a relationship between ejection force of the ejector unit 150 and the position of the ejection member 170 relative to the movable mold 33 according to the second embodiment. The ejection force is propelling force to move the EJ movable platen 152 and the ejection member 170 forward. In FIG. 7, driving force of the EJ motor 166 is unchanged, and the applied current to the EJ motor 166 is unchanged. FIG. 8 is a graph showing a relationship between ejection speed of the ejector unit 150 and the position of the ejection member relative to the movable mold 33 according to the second embodiment. The ejection speed is velocity to move the ejection member 170 forward. In FIG. 8, the number of rotations of the EJ motor 166 is unchanged.

In the present embodiment, as shown in FIGS. 4-6, the EJ movable platen 152 is disposed at a longer distance part from the movable mold 33 than the EJ toggle support 151. Therefore, when the ejector member 170 moves forward from the ejection start position, the distance between the EJ movable platen 152 and the EJ toggle support 151 becomes short, and an angle θ 100 between the centerline of the EJ toggle arm 161 and the centerline of the first EJ toggle link 162 becomes small. Therefore, in response to the forward movement of the ejection member 170, ejection characteristics changes as shown in FIGS. 7-8.

As shown in FIG. 7, when the ejection member 170 starts to move forward from the ejection start position, ejection force becomes weak rapidly. After that, the ejection force remains almost unchanged, although it becomes gradually weaker, then gradually stronger, in response to further forward movement of the ejection member 170.

As shown in FIG. 8, when the ejection member 170 starts to move forward from the ejection start position, ejection speed becomes fast rapidly. After that, the ejection speed remains almost unchanged, although it becomes gradually faster, then gradually slower, in response to further forward movement of the ejection member 170.

Thus, ejection characteristics of the ejection member 170 changes in response to the distance between the EJ toggle support and the EJ movable platen 152. In the present embodiment, as described above, when the ejector member 170 moves forward from the ejection start position, an angle θ 100 between the centerline of the EJ toggle arm 161 and the centerline of the first EJ toggle link 162 becomes small. Therefore, when starting ejection, the ejection speed is slow and the ejection force is strong, which makes it easier to separate a molding product. After separating the molding product, the ejector member 170 moves further forward to make the ejection speed become faster, which conveys the molding product to the pick-up position faster.

The operation of the ejector unit 150 is controlled by the controller 190 (see FIG. 6). The controller 190 is configured with a CPU 191, a ROM 192, a RAM 193, a storing section 194 such as a hard disk, input interfaces, output interfaces, a timer, a counter, and the like. The controller 190 implements various functions by having the CPU 191 execute programs stored in the ROM 192 or the storing section 194.

Figure 9:
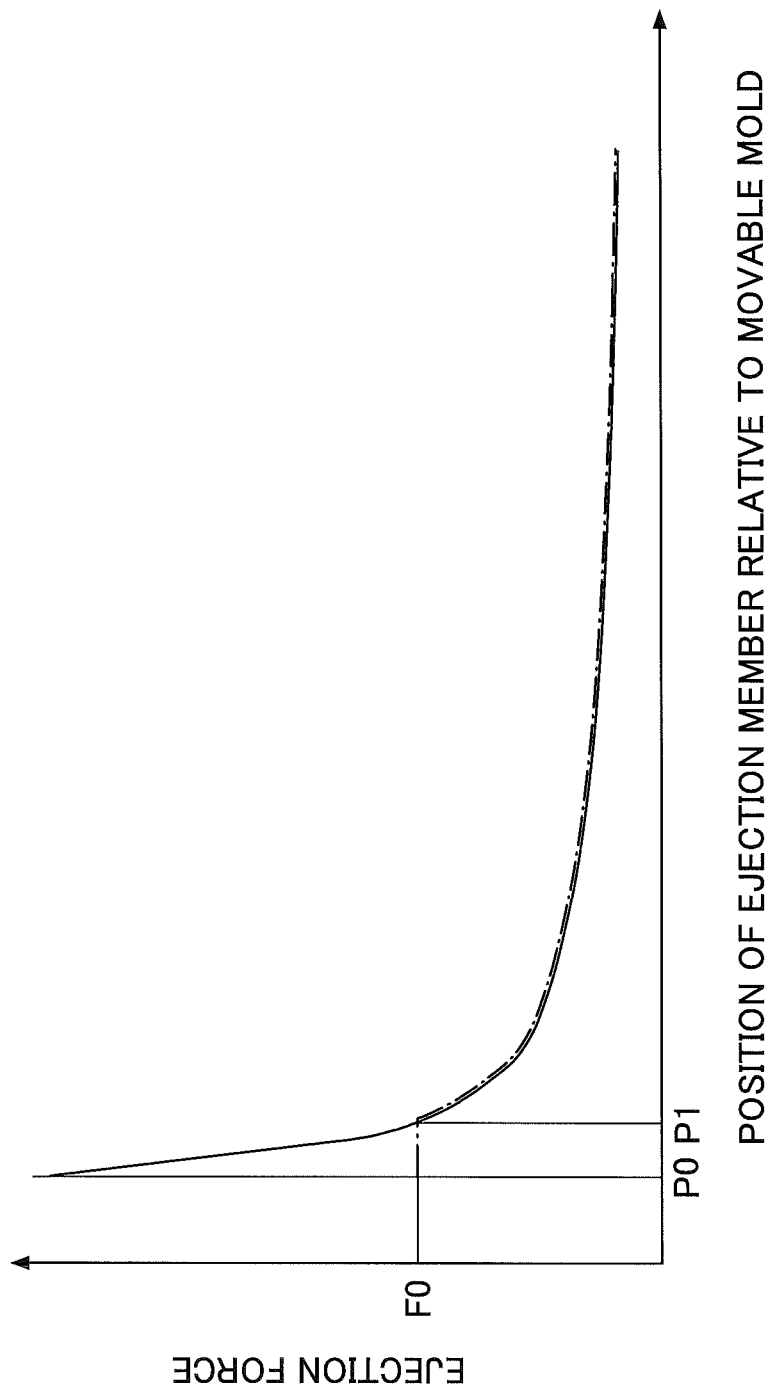
FIG. 9 is a graph showing another relationship between ejection force of an ejector unit and a position of an ejection member relative to a movable mold according to an embodiment.

FIG. 9 is a graph showing another relationship between ejection force of the ejector unit and the position of the ejection member 170 relative to the movable mold 33 according to the second embodiment. In FIG. 9, driving force or the EJ motor 166 is controlled by the monitored result of the position of the ejection member 170 relative to the movable mold 33. In FIG. 9, the solid line shows a relationship when a restriction applied to the driving force of the EJ motor 66 is released, and the dashed line shows when a restriction is applied to the driving force of the EJ motor 66.

When the position of the ejection member 170 relative to the movable mold 33 is within a prescribed range, the controller 190 restricts the driving force of the EJ motor 166 in the ejection direction if a prescribed condition is not met, the controller 190 releases the restriction if the prescribed condition is met.

If the prescribed condition is not met, the driving force of the EJ motor 166 in the ejection direction may be set to a value below a restriction value set in response to the position of the ejection member 170 relative to the movable mold 33. The restriction value may be a value corresponding to the upper limit of the ejection force F0, for example. If the prescribed condition is not met, the driving force may be set to a value below the upper limit of the ejection force F0.

On the other hand, if the prescribed condition is met, the driving force of the EJ motor 166 in the ejection direction may be set to a value over the restriction value.

In the present embodiment, the restriction value is set according to the position of the ejection member 170 relative to the movable mold 33. Alternatively, it may be a fixed value regardless of the position of the ejection member 170 relative to the movable mold 33.

The prescribed range to be monitored within whether the prescribed condition is met is not restricted, but it may be, for example, the range between the ejection start position P0 and a position P1 advanced from the ejection start position P0 with a prescribed distance. Alternatively, the range may be a whole range between the ejection start position P0 and the ejection completion position, or a range around the ejection start position P0, or the like.

The prescribed condition is not restricted, but a possible condition may be, for example, a stoppage of the ejection member 170 when the EJ motor 166 drives it in the ejection direction (the forward direction).

A stoppage of the ejection member 170 may be determined by:

(1) A position of one of the members driven by the EJ motor 166, for example, the ejection member 170, the EJ movable platen 152, etc. It can be determined that a driven member stops if the position of the driven member has not been changed substantially during a prescribed period of time while driving the EJ motor 166. The position of the driven member can be calculated, for example, with a detection result by the encoder section 166a of the EJ motor 166.

(2) The torque of the EJ motor 166. If the torque of the EJ motor 166 takes a value over a prescribed value for a prescribed period of time, then it can be determined that the ejection member 170 stops because a large force is required to make the driven member go forward while a molding product is attached to the movable mold 33 firmly. The torque of the EJ motor 166 can be calculated, for example, with a detection result by the current sensor 175.

(3) The driving time of the EJ motor 166. If the driving time of the EJ motor 166 reaches a prescribed period of time and the ejection of a molding product has not yet been completed, then it means that the ejection takes too much time, with which it can be determined that the ejection member 170 stops. The driving time of the EJ motor 166 can be measured, for example, by the timer on the controller 190.

(4) The separation force. If the separation force goes over a threshold value, then, it means that the molding product adheres to the movable mold 33 firmly, it can be determined that the ejection member 170 stops. The separation force can be detected, for example, with the separation force sensor 177. A threshold value to be used may include, for example, a actual value obtained when the guide holes 155 have no failure, or a predicted value based on the specification of the ejector unit 150 or the molding unit 30, or the like.

The stoppage of the ejection member 170 may be determined by a combination of the above four criteria to improve precision of a determination. Elements and numbers of a combination are not restricted.

As above, when the position of the ejection member 170 relative to the movable mold 33 is within a prescribed range, the driving force of the EJ motor 166 in the ejection direction (the forward direction) is restricted if a prescribed condition is not met, the restriction is released if the prescribed condition is met. Under normal conditions, it is possible to reduce workload of the ejection member 170 or the like by restricting the driving force in the ejection direction (the forward direction), and under abnormal conditions, it is possible to obtain sufficient propelling force by releasing the restriction.

As above, the injection molding machine has been described in detail with reference to preferred embodiments thereof. Further, the present invention is not limited to these embodiments, examples and aspects, but various variations and modifications may be made without departing from the scope of the present invention.

For example, the molding machine 10 in the above embodiments is a horizontally oriented type in which molds are opened/closed horizontally. Alternatively, the molding unit 30 may be opened/closed vertically. In this case, the ejector unit 50 or 150 may be disposed at the stationary platen to be used for ejection of a molding product from the stationary mold.

Also, in the above embodiments, the ejector unit 50 or 150 has an electric motor as a driving source. However, the driving source is not restricted to that. For example, a hydraulic motor may be used as a driving source. Or a hydraulic cylinder may be used. In the latter case, propelling force of the hydraulic cylinder may be directly transmitted to the EJ toggle mechanism 60 or 160, instead of using the EJ ball screw mechanism 67 or 167.

Also, in the above embodiments, the slide base 52 or 152 is disposed at a longer distance part from the movable mold 33 than the EJ toggle support 51 or 151. Alternatively, the slide base 52 or 152 may be disposed closer to the movable mold 33 than the EJ toggle support 51 or 151. In this case, different from the above embodiments, when an ejection starts, the distance between the EJ toggle support 51 or 151 and the slide base 52 and 152 becomes longer, and the angle θ or θ 100 between the centerline of the EJ toggle arm 61 or 161 and the centerline of the first EJ toggle link 62 are 162 becomes larger. Therefore, compared to the above embodiments, the ejection speed becomes faster while the ejection force becomes weaker when the ejection starts.

Also, in the above embodiments, the EJ rod 68 or 168 is connected to the molding product ejection member disposed at the movable mold 33. Alternatively, it may not be connected to the molding product ejection member. In this case, after the ejector rod 68 or 168 has moved forward to touch the molding product ejection member, then the ejector rod or 168 can move further forward to move the molding product ejection member forward. Afterwards, the molding product ejection member can move backward with a return spring disposed at the movable mold 33, which has been energized during the forward movement.

Also, among the parts of the ejection member 170 in the second embodiment, the EJ plate 171 and the EJ rod 168 may be disposed at the movable mold 33 as parts of the molding product ejection member. In this case, the ejection member 170 is configured only with the EJ tie bars 172.

Further, it should be understood that the invention is not limited to the above-described embodiments, but may be modified into various forms on the basis of the spirit of the invention. Additionally, the modifications are included in the scope of the present invention.

What is claimed is:

1. An injection molding machine comprising:
    an ejector unit configured to be disposed at a platen supporting a mold and eject a molding product from the mold,
    wherein the ejector unit includes
        a toggle support disposed at the platen supporting the mold;
        a slide base configured to move relative to the toggle support;
        a toggle mechanism configured to be disposed between the toggle support and the slide base;
        a driving source configured to operate the toggle mechanism;
        an ejection member movable in conjunction with the slide base; and
        a transmission mechanism to convert rotational motion generated by an electric motor as the driving source into linear motion to transmit to the toggle mechanism.

2. The injection molding machine as claimed in claim 1, wherein the slide base is disposed at a greater distance apart from the mold than the toggle support.

3. The injection molding machine as claimed in claim 1, wherein the ejection member includes
    a middle plate disposed at a certain distance apart from the slide base;
    a connection rod to connect the slide base and the middle plate; and
    an ejector rod to be ejected with a movement of the middle plate toward the mold.

4. The injection molding machine as claimed in claim 1, further comprising:
    a controller configured to control the driving source,
    wherein the controller restricts driving force in an ejection direction if a prescribed condition is not met, whereas the controller releases the restriction if the prescribed condition is met, when a position of the ejection member relative to the mold is within a prescribed range.

5. The injection molding machine as claimed in claim 1, wherein the toggle mechanism includes
    a toggle arm attached to one of the slide base and the toggle support so that the toggle arm can rotate about an axis;
    a first toggle link attached to another one of the slide base and the toggle support so that the first toggle link can rotate about an axis; and
    an end of the toggle arm and an end of the first toggle link are connected to each other movable rotationally.

6. The injection molding machine as claimed in claim 5, wherein the toggle mechanism includes
    a crosshead movable in a direction moving toward or away from the toggle support; and
    a second toggle link attached to the crosshead and the first toggle link so that the second toggle link can rotate about an axis.

* * * * *